US009142821B2

(12) United States Patent
Yang (10) Patent No.: US 9,142,821 B2
(45) Date of Patent: Sep. 22, 2015

(54) ELECTRODE ASSEMBLY AND SECONDARY BATTERY USING THE SAME

(71) Applicant: LG Chem, Ltd., Seoul (KR)

(72) Inventor: Seung-Min Yang, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/050,897

(22) Filed: Oct. 10, 2013

(65) Prior Publication Data

US 2014/0050957 A1 Feb. 20, 2014

Related U.S. Application Data

(63) Continuation of application No. PCT/KR2012/011598, filed on Dec. 27, 2012.

(30) Foreign Application Priority Data

Dec. 27, 2011 (KR) .................. 10-2011-0143762

(51) Int. Cl.
*H01M 10/0583* (2010.01)
*H01M 2/18* (2006.01)
*H01M 10/04* (2006.01)

(52) U.S. Cl.
CPC ............ *H01M 2/18* (2013.01); *H01M 10/0431* (2013.01); *H01M 10/0459* (2013.01)

(58) Field of Classification Search
CPC ..... H01M 6/10; H01M 2/14; H01M 10/0409; H01M 10/045; H01M 10/0459; H01M 10/125; H01M 10/286; H01M 10/0583
USPC ............ 429/129–133, 140, 145, 162, 164, 94
See application file for complete search history.

(56) References Cited

U.S. PATENT DOCUMENTS

| 4,327,163 | A | 4/1982 | Wheadon | |
|---|---|---|---|---|
| 6,627,343 | B1 * | 9/2003 | Kim et al. | 429/94 |
| 6,740,446 | B2 * | 5/2004 | Corrigan et al. | 429/152 |
| 7,195,840 | B2 * | 3/2007 | Kaun | 429/94 |

(Continued)

FOREIGN PATENT DOCUMENTS

| FR | 898361 A | | 4/1945 |
|---|---|---|---|
| JP | 2001076761 | * | 3/2001 |

(Continued)

OTHER PUBLICATIONS

International Search Report for Application No. PCT/KR2012/011598 dated Apr. 19, 2013.

(Continued)

*Primary Examiner* — Ula C Ruddock
*Assistant Examiner* — Thomas Parsons
(74) *Attorney, Agent, or Firm* — Lerner, David, Littenberg, Krumholz & Mentlik, LLP (57) ABSTRACT

Disclosed are an improved electrode assembly which may allow an electrode plate to be more easily impregnated with an electrolyte and also ensure gas to be easily discharged, and a secondary battery having the electrode assembly. The electrode assembly includes at least one cathode plate formed by coating an electrode current collector with a cathode active material, at least one anode plate formed by coating an electrode current collector with an anode active material, and a separator interposed between the cathode plate and the anode plate and having at least one vent formed therein.

6 Claims, 7 Drawing Sheets

(56) References Cited

U.S. PATENT DOCUMENTS

2003/0170533 A1 9/2003 Airey et al.
2011/0274960 A1 11/2011 Ahn

FOREIGN PATENT DOCUMENTS

| | | |
|---|---|---|
| JP | 2001076761 A | 3/2001 |
| JP | 2001319683 A | 11/2001 |
| JP | 2002-329530 A | 11/2002 |
| JP | 2004503055 A | 1/2004 |
| JP | 2005100899 A | 4/2005 |
| JP | 2007317638 * | 11/2007 |
| KR | 100286939 B1 | 1/2001 |
| KR | 1020110122378 | 11/2011 |

OTHER PUBLICATIONS

Search report from corresponding European Appln. No. 12862782, dated May 5, 2015.

* cited by examiner

ELECTRODE ASSEMBLY AND SECONDARY BATTERY USING THE SAME

CROSS-REFERENCE TO RELATED APPLICATION

The present application is a continuation of International Application No. PCT/KR2012/011598 filed on Dec. 27, 2012, which claims priority to Korean Patent Application No. 10-2011-0143762 filed in the Republic of Korea on Dec. 27, 2011, the disclosures of which are incorporated herein by reference.

TECHNICAL FIELD

The present disclosure relates to a secondary battery and an electrode assembly for the same, and more particularly, to an electrode assembly having excellent impregnation and ensuring easy degasing when a secondary battery is manufactured, and a secondary battery having the same.

BACKGROUND ART

Generally, a secondary battery refers to a rechargeable battery, while a general battery refers to a non-rechargeable battery. Secondary batteries are widely used for electronic devices such as cellular phones, notebook computers, video cameras, electric vehicles or the like. In particular, a lithium secondary battery has about three times the capacity of a nickel-cadmium battery or a nickel hydrogen battery generally used as power sources of electronic devices, and due to its high energy density per unit weight, the lithium secondary battery is utilized more and more.

A lithium secondary battery generally uses lithium oxide and carbonaceous material as a cathode active material and anode active material, respectively. The lithium secondary battery includes an electrode assembly in which a cathode plate and an anode plate respectively coated with the cathode active material and the anode active material are disposed with a separator being interposed between them, and a battery case which seals and accommodates the electrode assembly together with an electrolyte.

Meanwhile, a lithium secondary battery may be classified into a can type secondary battery where the electrode assembly is included in a metal can and a pouch type battery where the electrode assembly is included in a pouch of an aluminum laminate sheet, depending on the shape of the battery case. Generally, the can type secondary battery is accommodated in a battery can in a state where the cathode plate and the anode plate, namely electrode plates, are rolled, and the pouch type secondary battery is accommodated in a battery can in a state where the electrode plates are stacked or rolled.

Figure 1:
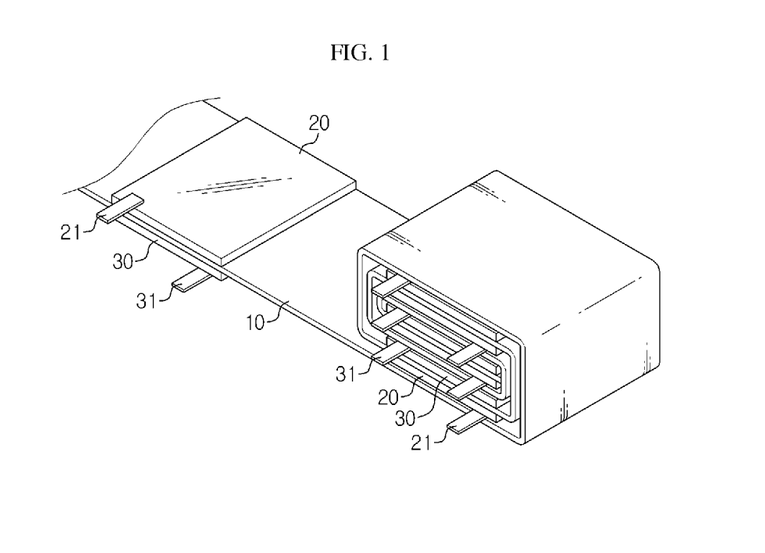
FIG. 1 is a perspective view schematically showing a general electrode assembly for a secondary battery, in which an electrode plate is stacked by folding a separator 10.

FIG. 1 is a perspective view schematically showing a general electrode assembly for a secondary battery in which electrode plates are stacked by folding a separator 10.

Referring to FIG. 1, the general electrode assembly for a secondary battery is configured so that a plurality of cathode plates 20 and a plurality of anode plates 30 face each other with the separator 10 being interposed between them. In addition, a cathode tab 21 is attached to the cathode plate 20, and an anode tab 31 is attached to the anode plate 30. At this time, when being interposed between the cathode plate 20 and the anode plate 30, the separator 10 may be separately provided to each layer. However, for the sake of convenience and structural stability, a single long separator 10 may be provided so as to be folded at the sides of the cathode plate 20 and the anode plate 30, as widely used in the art.

In addition, the electrode assembly configured as above is accommodated in a battery case and used for manufacturing a secondary battery through an electrolyte injecting process, an activating process, a degasing process or the like.

However, if the electrode assembly adopts the folded separator 10 as shown in FIG. 1, an electrolyte may not penetrate and gas may not be discharged through the folded portion of the separator 10.

Figure 2:
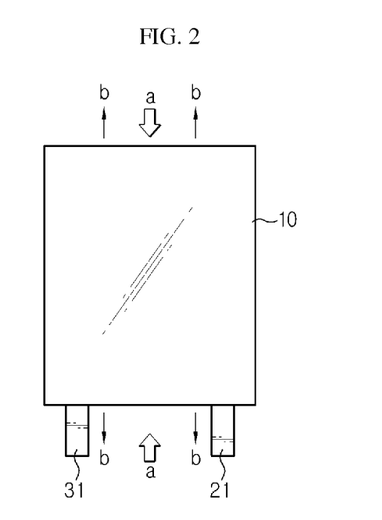
FIG. 2 is a diagram showing the electrode assembly of FIG. 1, observed from the above.

FIG. 2 is a diagram showing the electrode assembly of FIG. 1 from above.

As shown in FIG. 2, in the general electrode assembly in which the separator 10 is folded, penetration of an electrolyte into the electrode plate and discharge of gas therefrom are inevitably restricted. In other words, in the general electrode assembly, an electrolyte or gas should be injected or discharged at a front portion of the drawing, where an electrode tab is located, which is not blocked by the separator 10, or a portion opposite thereto, as depicted by arrows a and b. In addition, since a side of the electrode plate which is located at the right or left portion of the drawing is blocked by the separator 10, it is impossible for an electrolyte located outside of the electrode assembly to penetrate or gas in the electrode assembly to discharge through Therefore, in this configuration, it is not easy to impregnate the electrode plate with an electrolyte, and the degasing process cannot perform smoothly. Therefore, the time and costs for producing a secondary battery surely increases, and the performance and life span of the secondary battery are also badly affected.

DISCLOSURE

Technical Problem

The present disclosure is designed to solve the problems of the related art, and therefore the present disclosure is directed to providing an improved electrode assembly which may allow an electrode plate to be more easily impregnated with an electrolyte and also ensure gas to be easily discharged, and a secondary battery having the same.

Other objects and advantages of the present disclosure will be understood from the following description and become more apparent by embodiments of the present disclosure. In addition, it is easily understood that the objects and advantages of the present disclosure may be implemented by means defined in the claims or their combinations.

Technical Solution

In one aspect of the present disclosure, there is provided an electrode assembly for a secondary battery, which includes at least one cathode plate formed by coating an electrode current collector with a cathode active material; at least one anode plate formed by coating an electrode current collector with an anode active material; and a separator interposed between the cathode plate and the anode plate and having at least one vent formed therein.

Preferably, the separator may be folded at the sides of the cathode plate and the anode plate, and the vent may be formed at the folded portion.

More preferably, the separator may have the same folding direction at each layer.

Also preferably, the folding direction of the separator may vary oppositely at each layer.

Also preferably, the separator may be rolled into multiple layers together with the cathode plate and the anode plate.

In another aspect of the present disclosure, there is also provided a secondary battery, which includes the electrode assembly and a battery case.

Advantageous Effects

According to the present disclosure, when a secondary battery is manufactured, an electrolyte that is present outside of an electrode assembly may easily penetrate into the electrode assembly. Therefore, it is possible to enhance a wetting property of the electrode plate with respect to an electrolyte, which improves the performance and life span of the battery.

In addition, according to the present disclosure, when gas is generated in the electrode assembly, the gas may be easily discharged. In particular, during the degasing process for discharging gas generated during the activating process where charging/discharging repeats, gas between electrode plates may be easily discharged out, and the gas generated in use of the battery may also be easily discharged. Therefore, it is possible to prevent the electrode assembly from being distorted due to the gas generated between electrode plates, which improves the structural stability of the electrode assembly and enhance the performance and safety of the battery.

Moreover, since an electrolyte or gas may easily penetrate or discharge, the time required for the electrolyte injecting process and the degasing process is shortened, which reduces time and cost for manufacturing a secondary battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings in which.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

Meanwhile, the specification of the present disclosure has the terms 'upper', 'lower', 'left', 'right' or the like, which represents a direction, but these terms are used to show just relative locations, which can be varied depending on a point from which an electrode assembly is viewed, as obvious to those skilled in the art.

Figure 3:
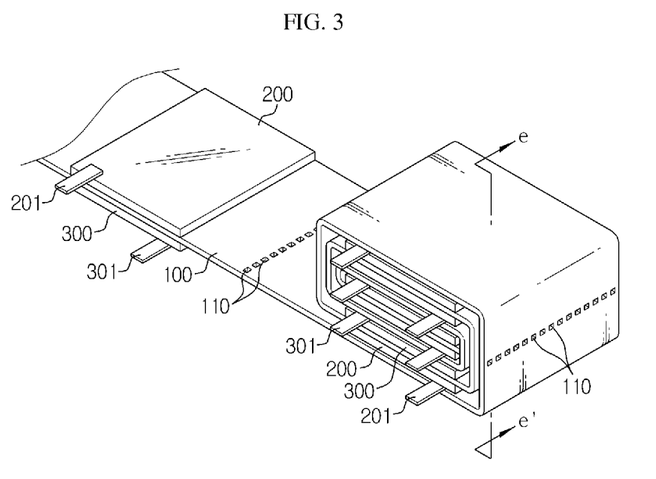
FIG. 3 is a perspective view schematically showing an electrode assembly for a secondary battery according to an embodiment of the present disclosure.

FIG. 3 is a perspective view schematically showing an electrode assembly for a secondary battery according to an embodiment of the present disclosure.

Referring to FIG. 3, the electrode assembly according to the present disclosure includes a cathode plate 200, an anode plate 300 and a separator 100.

The cathode plate 200 is formed by coating an electrode current collector with a cathode active material, and the anode plate 300 is formed by coating an electrode current collector with an anode active material. In addition, the cathode plate 200 and the anode plate 300 may respectively have a cathode tab 201 and an anode tab 301 to protrude therefrom.

Preferably, as shown in FIG. 3, there may be provided a plurality of cathode plates 200 and anode plates 300 to be alternately stacked. In this embodiment, a plurality of cathode plates 200 and anode plates 300 are present, which may increase the capacity of the secondary battery. However, the present disclosure is not limited thereto and may also have a single cathode plate 200 and a single anode plate 300.

The separator 100 is interposed between the cathode plate 200 and the anode plate 300. For example, as shown in FIG. 3, based on the separator 100, the cathode plate 200 may be located at an upper position and the anode plate 300 may be located at a lower position. In addition, the separator 100 insulates the cathode plate 200 from the anode plate 300 and allows the cathode plate 200 and the anode plate 300 to exchange active material ions.

The separator 100 may be provided to extend long. In this case, as shown in FIG. 3, a plurality of cathode plates 200 and a plurality of anode plates 300 may be disposed to be spaced apart from each other by a predetermined distance. For example, a plurality of cathode plates 200 may be disposed to be spaced apart from each other at an upper portion of the separator 100, and a plurality of anode plates 300 may be disposed to be spaced apart from each other at a lower portion of the separator 100.

In addition, in a state where the cathode plate 200 and the anode plate 300 are respectively disposed at the upper and lower portions of the separator 100, the separator 100 may be folded at the sides of the cathode plate 200 and the anode plate 300, so that the cathode plate 200 and the anode plate 300 are disposed to face each other with the separator 100 being interposed between them. In other words, referring to FIG. 3, the separator 100 may be folded at a portion where the cathode plate 200 and the anode plate 300 are not located.

At this time, the separator 100 may be folded in the same direction at each layer. For example, as shown in FIG. 3, when being observed from the front, the separator 100 may be implemented to be folded in a counterclockwise direction.

In particular, the separator 100 of the electrode assembly according to the present disclosure has a vent 110 formed at the folded portion as shown in FIG. 3. Here, the vent 110 is a passage through which an electrolyte or gas may flow in or out, and its term is not limited thereto if this may play the above role. For example, the vent 110 may be expressed in various terms such as a groove, a gap, an opening, a hole or the like.

According to this embodiment, during the electrolyte injecting process, an electrolyte may penetrate more easily, and during the degasing process or in use of the battery, gas may be discharged more easily.

Figure 4:
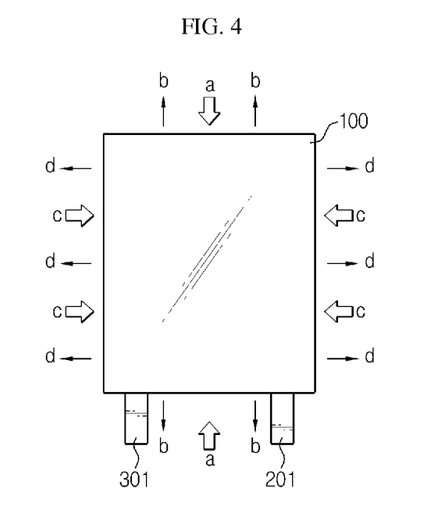
FIG. 4 is a diagram showing the electrode assembly of FIG. 3, observed from the above.

FIG. 4 is a diagram showing the electrode assembly of FIG. 3, observed from the above.

Referring to FIG. 4, the electrolyte may penetrate at a front side or a rear side, not blocked by the separator 100, as shown by arrow a. In addition, the electrolyte may also penetrate at a lateral side blocked by the separator 100, as shown by arrow c. In other words, since the vent 110 is formed at a side portion of the electrode plate at which the separator 100 is folded, an electrolyte may be introduced through the vent 110. Therefore, an electrolyte located outside of the electrode assembly may easily flow into the electrode assembly, which may improve electrolyte impregnation of the electrode plate.

Moreover, gas may also be discharged through the vent 110. In other words, the gas generated in the electrode assembly may be discharged in the direction depicted by arrow b and also in the direction depicted by arrow d by means of the vent 110. Therefore, the gas generated in the electrode assembly may be easily discharged out of the electrode assembly.

Meanwhile, when the separator 100 has the same folding direction at each layer as described above, the separator 100 may be stacked into multiple layers at the folded portion. In this case, the vent 110 formed in each layer of the folded portion may be at least partially connected to form a predetermined passage. This will be described later in more detail with reference to FIG. 5.

Figure 5:
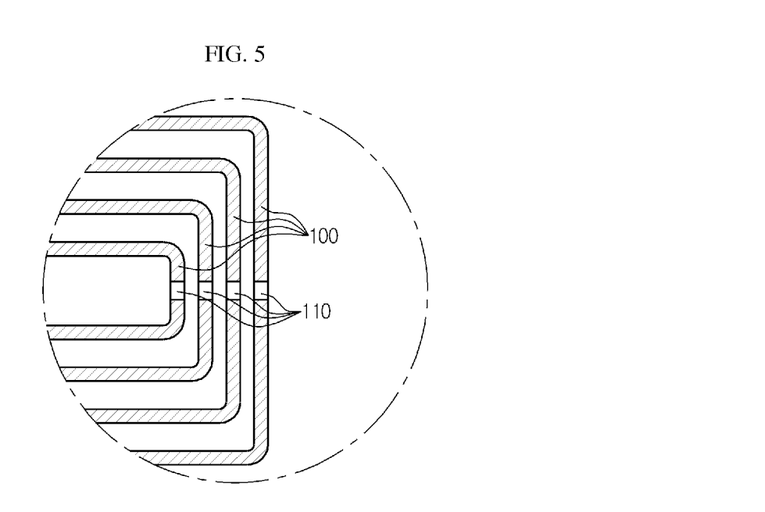
FIG. 5 is a partial sectional view, taken along the line e-e' of FIG. 3.

FIG. 5 is a partial sectional view, taken along the line e-e' of FIG. 3.

Referring to FIG. 5, the separator 100 is stacked into multiple layers at the folded portion, and the vents 110 formed in all layers of the folded portion are connected to each other. Therefore, a predetermined passage is formed through the vents 110 connected as described above between the inside and the outside of the electrode assembly, and this passage may be a path through which an electrolyte or gas may flow in or out. In other words, based on FIG. 5, an electrolyte may flow into the electrode assembly from the right to the left, and gas may discharge out of the electrode assembly from the left to the right.

More preferably, when the vents 110 formed in all layers of the folded portion of the separator 100 are connected to each other, it is preferable for the vents 110 of all layers to have the same location and shape. If the vents 100 of all layers of the separator 100 have the same location and shape as above, an electrolyte or gas may more easily flow in or out through the passage.

Meanwhile, even though FIG. 5 shows that the vents 110 are formed at the same height when the separator 100 is stacked into multiple layers at the folded portion, the present disclosure is not limited to this embodiment.

Figure 6:
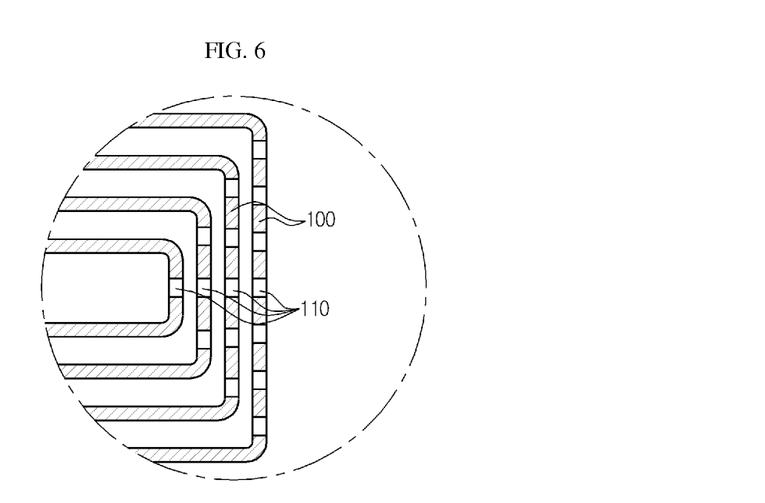
FIG. 6 is a partial sectional view showing a vent 110 of a separator 100 according to another embodiment of the present disclosure.

FIG. 6 is a partial sectional view showing a vent 110 of a separator 100 according to another embodiment of the present disclosure.

Referring to FIG. 6, the separator 100 stacked into multiple layers at the folded portion may be configured so that a vent 110 formed in an inner layer is connected to a vent 110 formed in an outer layer, while the number of vents 110 increases from the inner layer to the outer layer of the separator 100. The number of electrode plates surrounding the separator 100 may increase from the inner layer to the outer layer at the folded portion of the separator 100. In this embodiment, since the number of vents 110 also increases from the inner layer to the outer layer, an electrolyte or gas may penetrate or discharge uniformly at each layer.

In order to form the vent 110 at the folded portion of the separator 100, as shown in FIG. 3, the vent 110 may be formed between electrode plates before the separator 100 is folded. However, the present disclosure is not limited thereto, but the vent 110 may also be formed at a lateral side after the separator 100 is folded.

In addition, the vent 110 depicted in FIG. 3 is just an example, and the vent 110 of the separator 100 may be implemented in various ways.

FIGS. 7 to 10 are schematic diagrams showing the vent 110 of the separator 100 according to other embodiments of the present disclosure.

Figure 7:
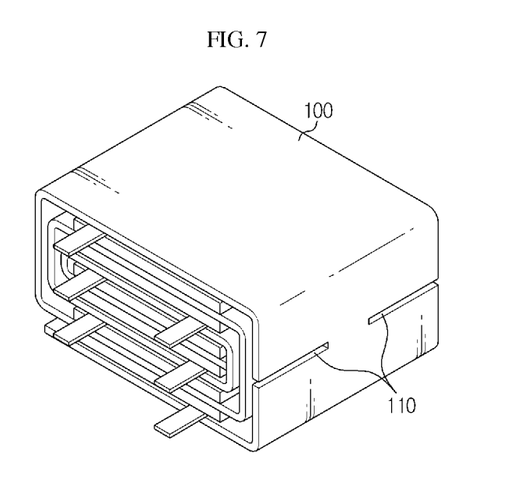
FIGS. 7 to 10 are schematic diagrams showing the vent 110 of the separator 100 according to other embodiments of the present disclosure.

Referring to FIG. 7, two vents 110 are formed at the folded portion of the separator 100 to extend long and then be cut at front and rear ends where the electrode tabs are positioned.

Figure 8:
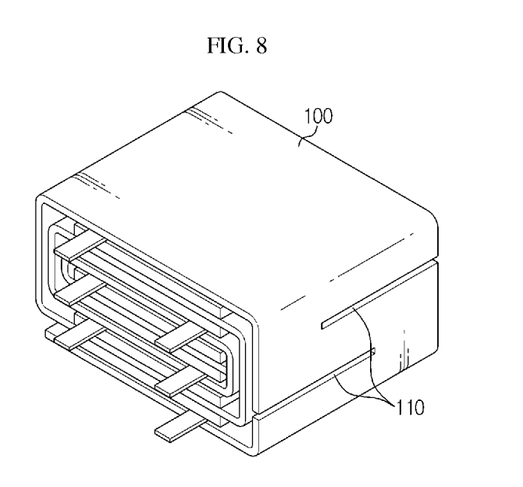

In addition, referring to FIG. 8, two vents 110 are formed at the folded portion of the separator 100, similar to FIG. 7, but the vents 110 extend long and can be cut at different heights to partially overlap each other at different heights.

Figure 9:
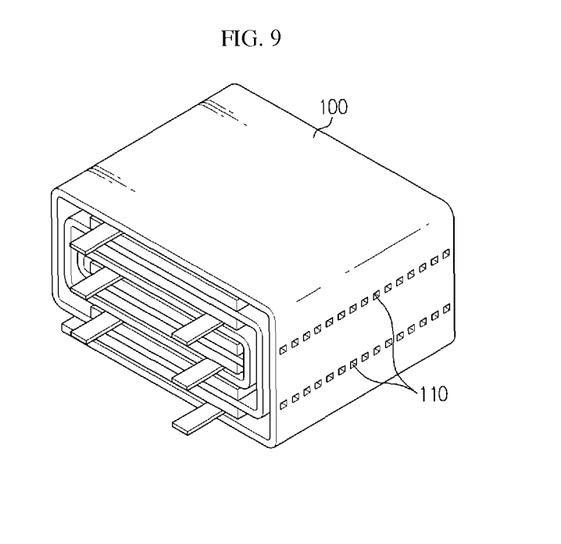

Moreover, referring to FIG. 9, a plurality of vents 110 are formed at the folded portion of the separator 100, and the plurality of vents 110 form two rows from the front surface of the electrode assembly to the rear surface thereof and are spaced apart from each other by a predetermined distance.

Figure 10:
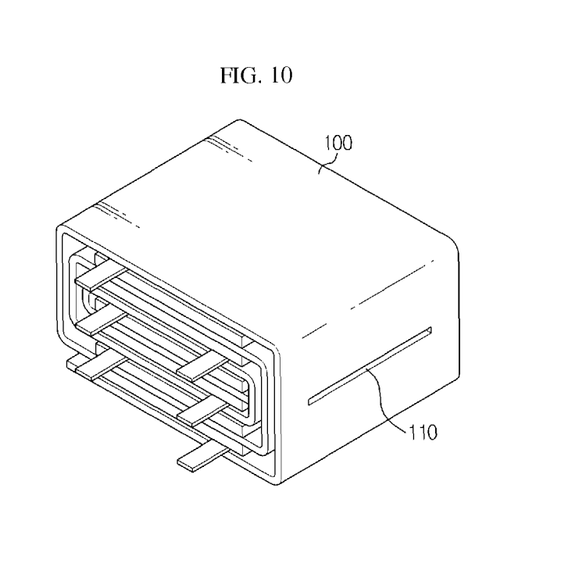

Meanwhile, as shown in FIG. 3 or 7 to 9, a plurality of vents 110 may be formed at a single folded portion of the separator 100. If a plurality of vents 110 are formed at a single folded portion of the separator 100, an electrolyte or gas may more easily flow in or out through the vents 110 without deteriorating the structural stability of the separator 100. However, the present disclosure is not limited to this embodiment. In other words, as shown in FIG. 10, only one vent 110 may be formed at a single folded portion of the separator 100.

In addition, the vent 110 may be formed with various shapes in the separator 100.

Meanwhile, even though the above embodiments have been described based on a configuration in which the separator 100 is folded in the same direction at each layer, the separator 100 may also be folded in opposite directions at each layer.

Figure 11:
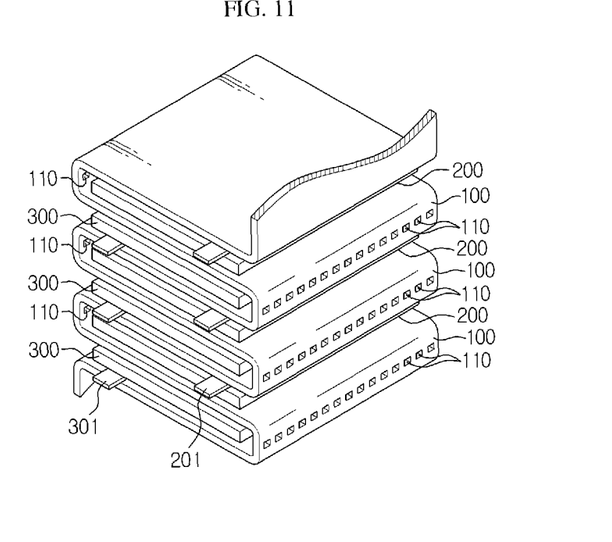
FIG. 11 is a perspective view schematically showing an electrode assembly for a secondary battery according to another embodiment of the present disclosure.

FIG. 11 is a perspective view schematically showing an electrode assembly for a secondary battery according to another embodiment of the present disclosure.

Referring to FIG. 11, a plurality of cathode plates 200 and anode plates 300 are stacked alternately, and the separator 100 is interposed between the cathode plates 200 and the anode plates 300 and folded at the sides of the cathode plates 200 and the anode plates 300. However, at this time, the folding direction is not one-directional but bi-directional. In other words, the separator 100 is folded in a direction opposite to the folding direction of an adjacent layer. In more detail, in FIG. 11, the separator 100 is folded left at the lowermost layer to surround a side of an anode plate 300, folded right at the next layer to surround a side of a cathode plate 200, and then folded left again at the next layer to surround a side of an anode plate 300.

Even though the separator 100 is folded while varying the folding direction oppositely at each layer, at least one vent 110 is formed at the folded portion of the separator 100 of the electrode assembly according to the present disclosure. Therefore, in this case, an electrolyte or gas may flow in or out not only at a portion not blocked by the separator 100 but also at a portion blocked by the separator 100 by means of the vent 110. In other words, in the embodiment of FIG. 11, an electrolyte may penetrate and gas may discharge not only at the left side of the anode plate 300 and the right side of the cathode plate 200 where the separator 100 is not present but also at the right side of the anode plate 300 and the left side of the cathode plate 200 where the separator 100 is present by means of the vent 110 formed at the folded portion of the separator 100.

Therefore, according to this embodiment, even though the separator 100 is folded in alternating directions at each layer, an electrolyte or gas may flow in or out more easily.

Figure 12:
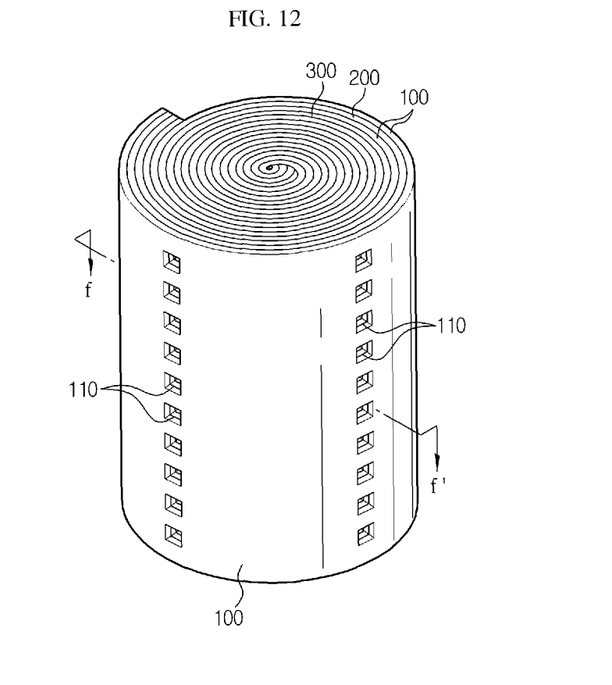
FIG. 12 is a perspective view schematically showing an electrode assembly for a secondary battery according to still another embodiment of the present disclosure.
Figure 13:
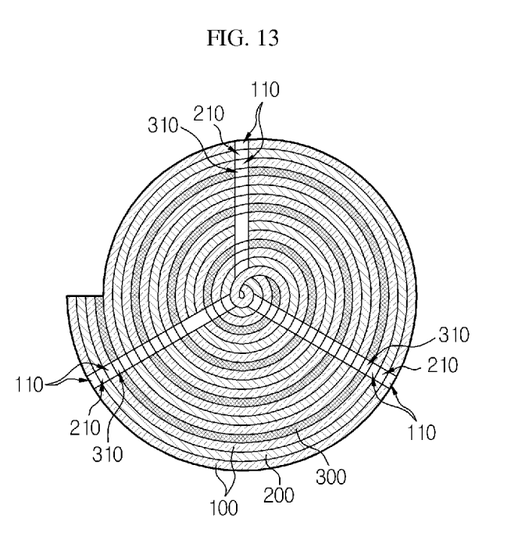
FIG. 13 is a diagram showing a section taken along the line f-f of FIG. 12, observed from the above.

FIG. 12 is a perspective view schematically showing an electrode assembly for a secondary battery according to still another embodiment of the present disclosure, and FIG. 13 is a diagram showing a section taken along the line f-f of FIG. 12, observed from the above.

Referring to FIGS. 12 and 13, the separator 100 may be rolled into multiple layers together with the cathode plate 200 and the anode plate 300. In other words, the separator 100 is positioned between a single cathode plate 200 and an anode plate 300, which are formed long like the separator 100, and another separator 100 is located at the outer side. After that, they are rolled to form an electrode assembly with a jelly-roll shape. In addition, the vent 110 is formed in the separator 100 rolled together with the cathode plate 200 and the anode plate 300 as described above.

In particular, in this case, as shown in FIG. 13, vents 210, 310 may also be formed in the cathode plate 200 and the anode plate 300, similar to the separator 100. In addition, the vents 210, 310 formed in the cathode plate 200 and the anode plate 300 as described above may be at least partially connected to the vent 110 formed in the separator 100 to form a predetermined passage. In the electrode assembly in which the separator 100 is rolled together with the cathode plate 200 and the anode plate 300, even though the vent 110 is formed in the separator 100, penetration of electrolyte or discharge of gas may be interrupted by the cathode plate 200 and the anode plate 300. However, if the vents 210, 310 are formed in the cathode plate 200 and the anode plate 300 and further the vents 210, 310 of the electrode plates are connected to the vent 110 of the separator 100 from the inside of the electrode assembly to the outside thereof, an electrolyte or gas may easily flow in or out between the center of the electrode assembly and the outside thereof.

Meanwhile, the shapes of the vents 110, 210, 310 depicted in FIG. 12 are just an example, and the present disclosure is not limited to the detailed shapes of the vents 110, 210, 310. In particular, even though FIG. 13 shows that the vents 110, 210, 310 are formed in the separator 100, the cathode plate 200 and the anode plate 300 to form three passages in total in the electrode assembly, this is just an example, and the vents 110, 210, 310 may also be provided to form passages not greater than three or passages more than three.

The secondary battery according to the present disclosure includes a battery case together with the electrode assembly described above. The battery case accommodates the electrode assembly and an electrolyte and may be implemented with various materials or shapes, for example a metal can shape or an aluminum pouch shape.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. An electrode assembly for a secondary battery, comprising:
    at least one cathode plate formed by coating an electrode current collector with a cathode active material;
    at least one anode plate formed by coating an electrode current collector with an anode active material;
    a separator interposed between each of the at least one cathode plate and each of the at least one anode plate, the separator having a plurality of vents formed therein;
    wherein the separator is folded around a side of each of the at least one cathode plate and the at least one anode plate at a respective folded portion, wherein the separator follows a serpentine path such that each successive one of the folded portions along the path is on an opposing side of the electrode assembly from a previous one of the folded portions along the path, and wherein the vents are formed at the folded portions.

2. The electrode assembly for a secondary battery according to claim 1,
    wherein a plurality of the cathode plates and the anode plates are alternately stacked with the folded separator being interposed therebetween.

3. The electrode assembly for a secondary battery according to claim 1,
    wherein the separator has a plurality of the vents at a single one of the folded portions.

4. A secondary battery, comprising:
    an electrode assembly including a cathode plate, an anode plate, and a separator interposed between the cathode plate and the anode plate and having a plurality of vents formed therein; and
    a battery case for accommodating the electrode assembly and an electrolyte;
    wherein the separator is folded around a side of each of the cathode plate and the anode plate at a respective folded portion, wherein the separator follows a serpentine path such that each successive one of the folded portions along the path is on an opposing side of the electrode assembly from a previous one of the folded portions along the path, and wherein the vents are formed at the folded portions.

5. The secondary battery according to claim 4,
    wherein a plurality of the cathode plates and the anode plates are alternately stacked with the folded separator being interposed therebetween.

6. The secondary battery according to claim 4,
    wherein the separator has a plurality of the vents at a single one of the folded portions.

* * * * *